No. 653,523. Patented July 10, 1900.
F. O'NEILL.
MACHINE FOR MANUFACTURING GLASS ARTICLES.
(Application filed Sept. 29, 1899.)
(No Model.) 4 Sheets—Sheet 3.

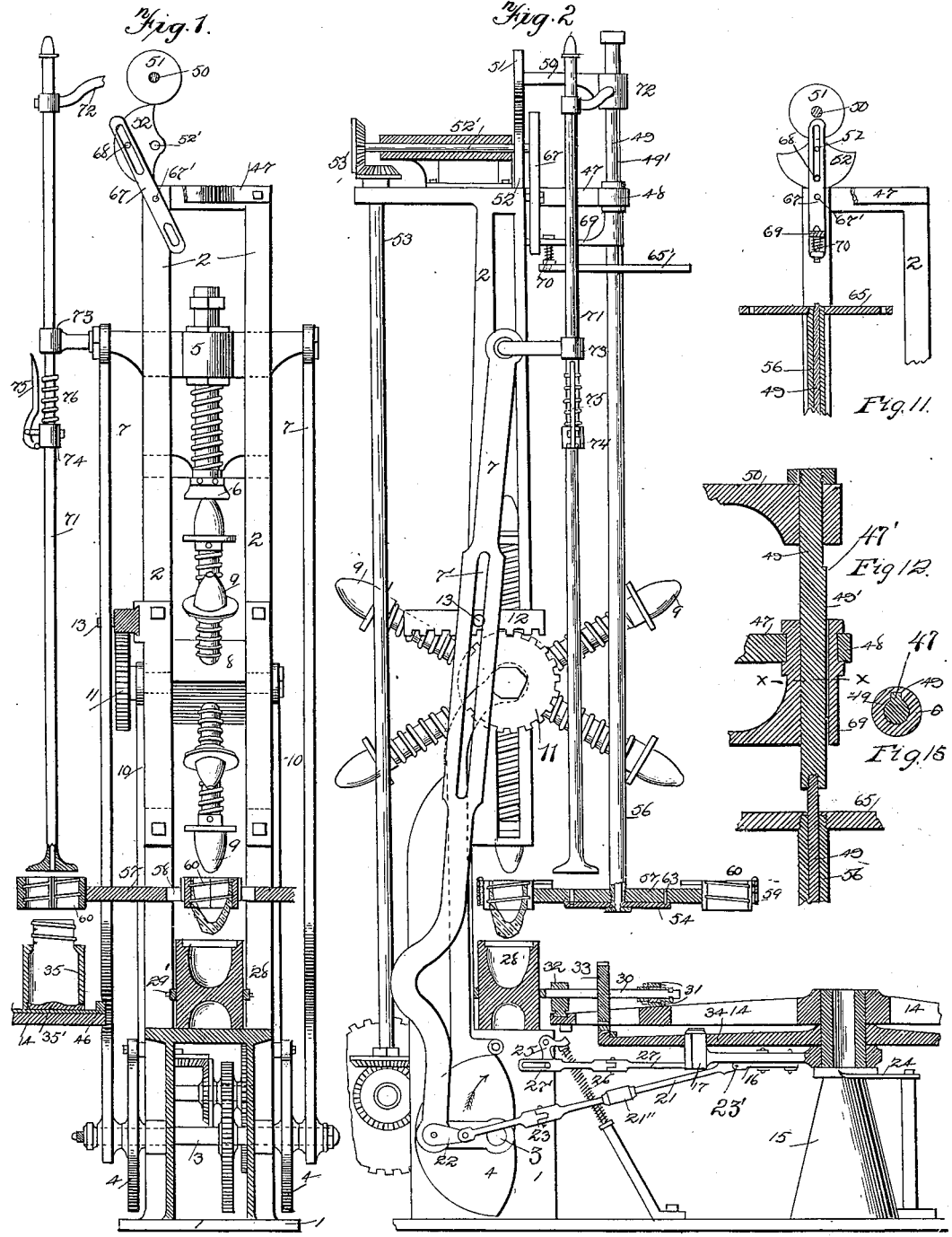

Witnesses. Inventor.
Frank O'Neill
by
Attorney.

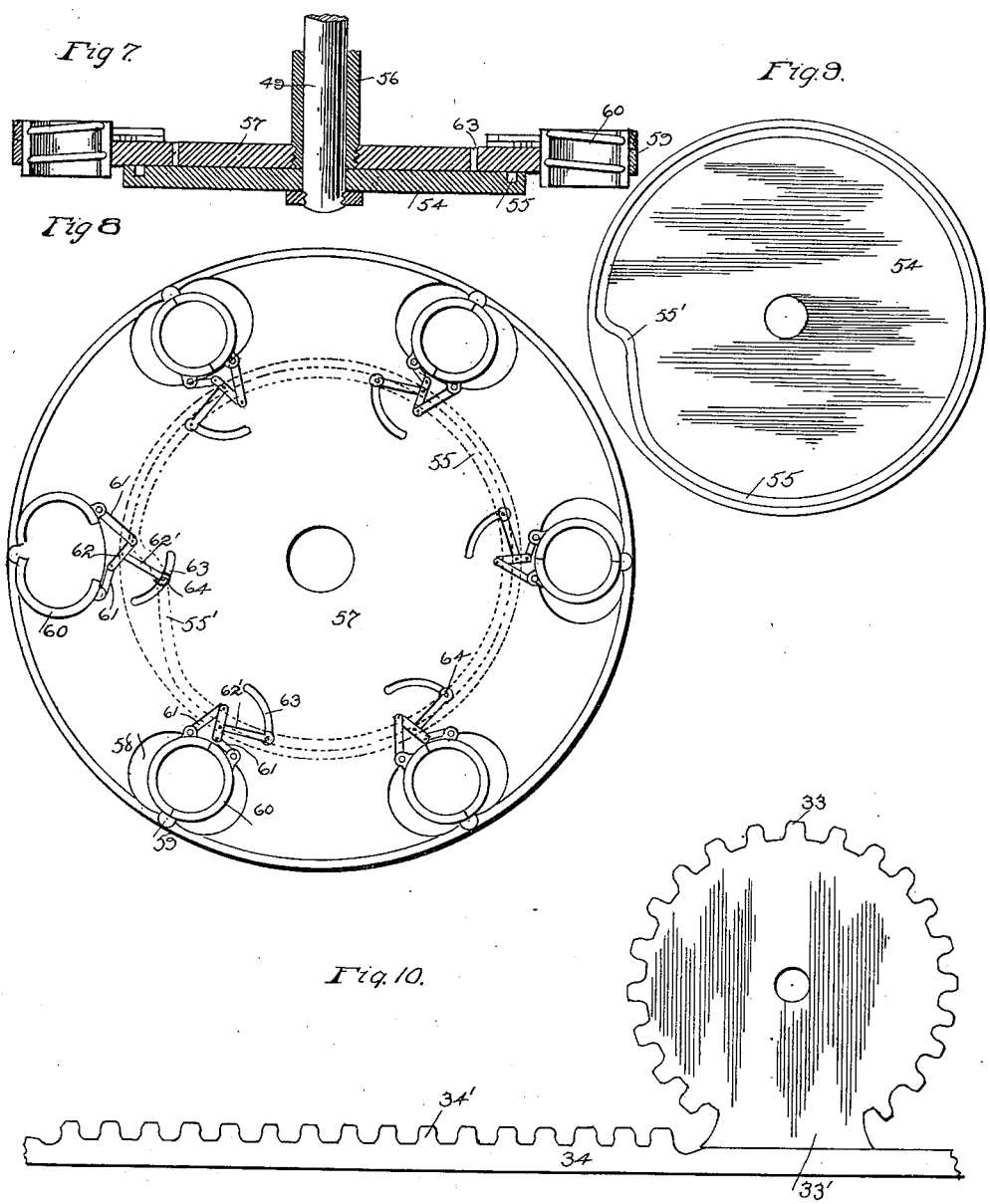

UNITED STATES PATENT OFFICE.

FRANK O'NEILL, OF WALLACEBURG, CANADA.

MACHINE FOR MANUFACTURING GLASS ARTICLES.

SPECIFICATION forming part of Letters Patent No. 653,523, dated July 10, 1900.

Application filed September 29, 1899. Serial No. 732,017. (No model.)

*To all whom it may concern:*

Be it known that I, FRANK O'NEILL, a citizen of the United States, residing at Wallaceburg, in the Province of Ontario, Canada, have invented new and useful Improvements in Machines for Manufacturing Glass Articles, of which the following is a specification.

The primary object of this invention is to provide a machine of improved construction for manufacturing such glass articles as are partially formed by pressing and completed by blowing.

A further object is to improve certain parts of the machine patented to me June 14, 1898, No. 605,647, and December 20, 1898, No. 616,251.

The invention consists in the novel features of construction and in the combination and arrangement of parts hereinafter fully described and claimed, and illustrated by the accompanying drawings, in which—

Figure 3:
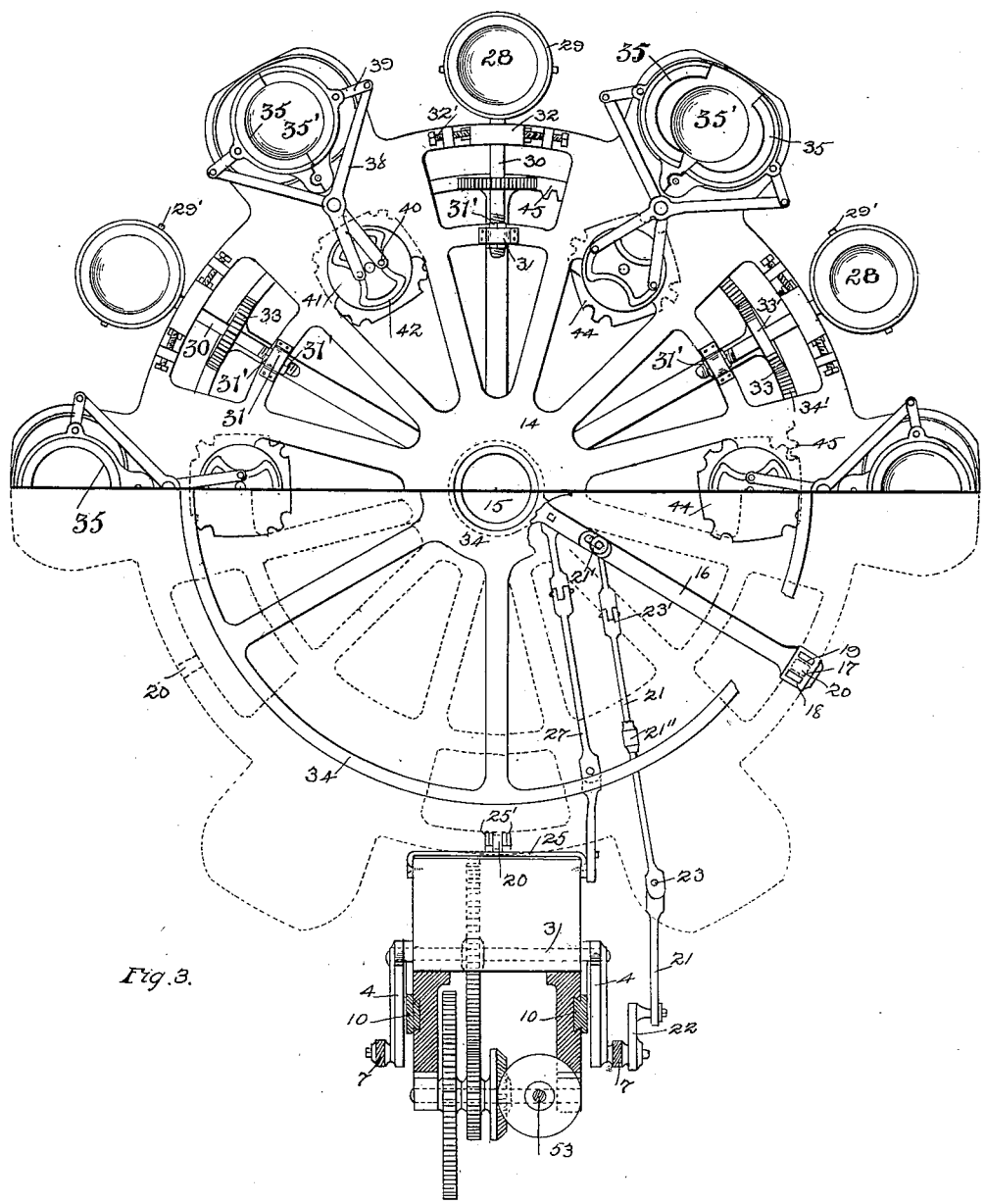
Figure 5:
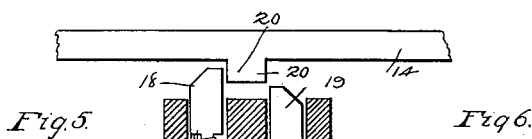
Figure 6:
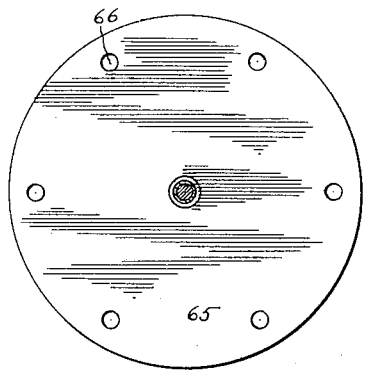
Figure 4:
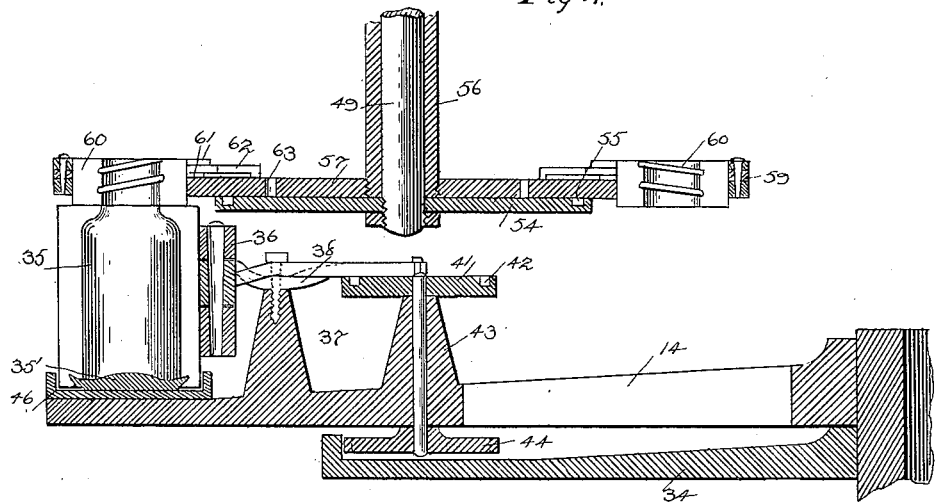

Figure 1 is a front elevation of the machine-frame, pressing mechanism, and blowpipe, one of the press-molds and the base of the frame being shown in section. Fig. 2 is a side elevation of the machine, showing a portion of the mold-carrier in vertical section. Fig. 3 is a plan view of the mold-carrier, one-half of the same being shown in dotted lines, the view including a sectional plan view of the machine-frame, actuating mechanism, &c. Fig. 4 is a vertical sectional view of the blow-mold and attending mechanism. Fig. 5 is a detail view of the latch mechanism carried by the carrier-actuating arm. Fig. 6 is a plan view of a plate or wheel through which intermittent rotation is imparted to the neck-mold carrier. Fig. 7 is a cross-sectional view, and Fig. 8 a plan view, of the neck-mold carrier with molds in position. Fig. 9 is a plan view of the cam-plate for opening and closing the neck-molds. Fig. 10 is an enlarged detail view of the rack and gear for rotating the press-molds. Figs. 11, 12, and 13 are detail views of the upper portion of the actuating mechanism, Fig. 13 being taken on line *x x* of Fig. 12.

1 is the base, and 2 the upright portion, of the machine-frame.

3 is the drive-shaft; 4, the cams on the shaft; 5, the cross-head carrying depressor 6, and 7 the pitman connecting head 5 and cams 4.

8 is the plunger-shaft, 9 the plungers arranged radially on the shaft, and 10 the vertical side bars depending from shaft 8 and operating on cams 4 to reciprocate the plunger-shaft.

The operation and construction of the parts thus far referred to are substantially the same as disclosed in my Patent No. 616,251 and need not here be more particularly referred to. The mechanism for imparting intermittent rotary motion to the plunger-shaft is, however, an improvement on the corresponding mechanism of my former patents, and consists of a cogged gear 11 on shaft 8 and operating in conjunction with rack 12, slidable horizontally in frame 2. Pin 13 projects from the rack into slot 7' of pitman 7, and the rack is thereby reciprocated by the motion of the pitman. The rack and gear are in engagement (shown in Figs. 1 and 2) and so remain during the succeeding half-revolution of cams 4. At the same time the pitman is traveling forward and upward in the direction of the arrow, Fig. 2, and during this movement rack 12 is advanced laterally sufficiently to impart one-sixth of a revolution to gear 11 and shaft 8, bringing a fresh plunger 9 to operative position. The gear and rack then separate by the passage downward of bars 10 over the abruptly-curved sides of cams 4, leaving the rack free for its return reciprocation.

The mold carrier or table 14 is rotatably mounted on post 15, and intermittent motion is imparted thereto for positioning the molds by arm 16, revoluble on post 15 beneath the carrier and carrying at its outer end head 17, in which are the two vertically-reciprocating latches 18 and 19, held normally raised by springs 18' and 19'. The space between the beveled heads of these latches is sufficient to accommodate lugs 20 on the under side of carrier 14. Arm 16 is oscillated by rod 21, adjustably connected thereto at 21', the rod at its opposite end connecting with crank 22, secured to the wrist-pin of pitman 7. Rod 21 is jointed oppositely at 23 and 23' to conform to the oscillations vertically and horizontally of crank 22 and arm 16. Adjustable connection 21' and turnbuckle 21'' of rod 21 afford longitudinal adjustment therefor, whereby its length may be exactly conformed to the required throw of arm 16.

Latch 18 is what I term the "pushing-latch"

for advancing the table, and when arm 16 is drawn backward for a new hold on the carrier latch 18 is automatically depressed by lug 20 and after passing thereunder raises in engagement therewith and in position for pushing. Latch 19 is for the purpose of giving actuating-arm 16 a firm hold on the table, preventing the latter from moving too fast or too far by reason of its own momentum. At the end of the advancing stroke the rigidly-supported finger 24 enters between nut 19'' on bolt 19 and the bottom of head 17, depressing the bolt and freeing arm 16 for the backward oscillation, and such oscillation freeing latch 19 from finger 24 the former resumes its former projecting position and ready for a new hold.

After carrier 14 has been moved sufficiently to place the molds in operative position it is locked by the automatic engagement of one of lugs 20 with the depressible latch 25, the forward one of latch-jaws 25' being beveled to permit lug 20 to ride thereover. The latch is held normally raised by spring 26. Arm 27 connects the latch with arm 16 and is slotted at 27' to have sliding engagement with pin 25'', projecting from the latch, the slotted arm sliding on the pin during the greater part of the reciprocations of said arm, the arm positively engaging the latch and depressing it against spring only during the latter part of its backward movement. The latch is thus lowered and clear of lug 20, so that carrier 14 is free to again advance with the advancing reciprocation of arm 16.

The press-molds 28, which are positioned successively over base 1 and beneath and in line with the plungers, are removably secured and adjustable vertically in holders 29 by screws 29', each holder being secured on the outer end of shaft 30, revoluble in bearings 31 and 32 on table 14. The shaft is threaded and is moved longitudinally through its bearings and secured in adjustment by lock-nuts 31' on opposite sides of bearing 31. Bearing 32 is slidable radially on the carrier and secured by set-screws 32', whereby the press-molds may be given such slight radial adjustment as expansion or contraction may render necessary, such adjustment being insufficient, however, to cramp the shaft in the bearings.

Each shaft 30 carries a gear 33, flattened at 33' to slide on the uncogged portion of circular rack 34, fixed to post 15. Said rack is formed on its top with cogs 34' of same number as cogs on gear 33, which when reached by gear 33 imparts to the same a complete rotation, thus turning molds 28 for discharging pressed articles, as when the machine is used alone for pressing. Thus the flat portion 33' of gear 33 is in engagement with the flat top surface of rack 34, excepting when the cogs of the rack and gears are in engagement, as above described, thereby holding shafts 30 fixed, with molds 28 in upright or pressing position.

The blow-molds 35 are arranged on carrier 14 in the circle of press-molds 28 and alternating therewith. Each mold 35 is made in two parts connected on the inner side by hinge 36.

37 is a post raised from carrier 14, and pivoted thereon are the crossed levers 38, which at their outer ends are connected by links 39 to opposite sides of the mold and at their inner ends provided with pins 40, which depend into continuous double cam-groove 42 of plate 41. This plate is secured to the upper end of shaft 43, journaled vertically in the carrier, and at the lower end of the shaft is gear 44. Arranged at intervals on the inner periphery of circular rack 34 are cogs 45 and 45'. Traversing cogs 45 gear 44 is turned and with it plate 41, thus opening the mold for removing the completed article. Pins 40 are then in the widest part of cam-groove 42, and in this position they remain, with the mold open, until gear 44 reaches cogs 45', and by traversing same the gear and grooved plate are so turned as to restore pins 40 to the narrowest part of the groove, with the mold closed. The grooved plate not only operates to open and close the mold, but also holds it rigid in whatever position the plate may be turned, the flat portion of gear 44, sliding on the smooth portion of rack 34, also holding the molds in requisite adjustment.

Each mold 35 opens and closes in an oblong flanged base 46, to which bottom 35' of the mold is fixed, said bottom having a dovetail edge and the mold sides dovetail grooves to fit closely therearound.

Extending frontward from the upper part of frame 2 is bracket 47, having the vertical socket 48, and movable vertically therethrough is shaft 49, carrying at its upper end the inwardly-extending arm 50, on which is journaled roller 51, and this roller plays on the periphery of cam 52 on the shaft 52', said shaft being actuated by the driving mechanism at the base of the machine through the medium of the shaft 53 and gears 53'.

Shaft 49 hangs suspended over carrier 14 and at the lower end support the plate 54, formed with cam-groove 55. Movable vertically with shaft 49 and revoluble thereon is the elongated tubular shaft 56, having at its lower end and immediately over plate 54 the neck-mold carrier or wheel 57, formed with oblong openings 58, and hinged at their outer sides at 59 in these openings are the divided neck molds or rings 60. The sides of each mold are connected by links 61 to the opposite ends of the T-shaped lever 62, fulcrumed to wheel 57. The long arm 62' of the lever moves over curved slot 63 in carrier or wheel 57, and 64 is a pin depending from said arm through slot 63 and into groove 55 of plate 54. With the pin traveling in the concentric part of the groove mold 60 remains closed and is opened only when pin 64 traverses offset 55' of the groove.

Secured to the upper end of tubular shaft 56 is plate 65, having a circular series of apertures 66.

67 is a lever fulcrumed between its ends at 67' to frame 2 and at its upper end is slotted to play on pin 68, carried by cam 52. The lower end of the lever is loosely engaged by arm 69, horizontally rotatable in socket 48. Shaft 49 moves vertically through arm 69 and is splined thereto at 49', so as to reciprocate therewith when said arm is actuated by lever 67. Depending from this arm is spring-bolt 70, which is above and adapted to enter successively apertures 66 of plate 65.

71 is the blast or blow pipe, suspended from bracket 72, projecting laterally from and movable vertically with arm 50, the upper end of the pipe being adapted to receive a hose (not shown) reaching to a supply of compressed air. The pipe extends loosely through arm or guide 73, carried by cross-head 5. The pipe is valved at 74, the valve being opened at the downstroke of the cross-head through the medium of vertically-disposed lever 75, which is pressed outward by the descent of arm 73 and held open thereby until the cross-head rises, which is after the blowing operation is completed. A spring 76 is interposed between valve 74 and arm 73, which is compressed by the latter, holding the blowpipe solidly to the mold while emitting the blast.

The operations of pressing and blowing are carried on simultaneously in adjacent molds while mold-carriers 14 and 57 are at rest, the latter being in its lowermost position with adjacent ring-molds 60 closed and resting on adjacent press and blow molds. A batch of glass having been previously placed in the press-mold the plunger descends and presses in neck mold or ring 60 the neck of the jar or other article. At the same time the next adjacent blow-mold is in position beneath blow-pipe 71 and contains the blank pressed by the preceding operation and which is subjected to the blast, thus forming the body of the jar or other article. At the completion of the pressing and blowing operations and before shafts 49 and 56 begin to rise the motion of lever 67 is reversed, reversing the motion of arm 69, and shaft 49, turning with said arm by reason of spline 47', plate 54 is turned sufficiently to pass pin 64 into offset 55' of groove 55, which opens ring 60 away from the neck of the article in the blow-mold. Shafts 49 and 56 are then raised by the action of cam 52 on roller 51, raising with them the neck-mold carrier 57, whereby the blank of glass still remaining in the neck-mold is lifted out of the press-mold and the previously-opened neck-mold 60 away from the blown article. Plate 65, rising with the shafts, is engaged at one of its apertures with bolt 70, and at this juncture lever 67 begins its forward reciprocation, and before this engagement is broken by lowering of shafts 49 and 56 the latter have been given one-sixth of a revolution. During this operation the mold-carrier 14 has also been advanced one-sixth of a revolution, placing a fresh blow-mold in position to receive the previously-pressed blank, which is lowered thereinto. At the same time a fresh neck mold or ring 60 is lowered to position on the fresh press-mold beneath the plunger and the operations of pressing and blowing are repeated. The action of the descending cross-head in opening the blast-pipe valve and depressing said pipe to the mold has been fully explained above, and it will be understood that this operation occurs simultaneously with the operation of pressing. As the blow-mold moves forward by the advance of carrier 14 it is automatically opened and the completed article removed. The blow-mold is then automatically closed also, as before described, and so remains until ready to discharge another finished article.

The neck molds or rings and blow-molds are removable and may be changed to conform to the work in hand. The plunger-heads and press-molds may in like manner be varied for different forms of articles—as, for instance, tumblers, jelly-glasses, &c.—capable of formation entirely by pressing.

Having thus fully described my invention, what I claim as new, and desire to secure by Letters Patent, is—

1. The combination of press and blow molds, a neck-mold carrier movable over said molds, and neck-molds permanently mounted on the carrier and adapted to be positioned thereby over the press and blow molds, substantially as shown and described.

2. The combination of an endless carrier, press and blow molds operative thereon, an endless neck-mold carrier movable over the first-mentioned carrier, and neck-molds permanently mounted on the neck-mold carrier and adapted to be positioned thereby over press and blow molds, substantially as shown and described.

3. The combination of an endless carrier, press and blow molds arranged thereon alternately and at equal distances apart, a second endless carrier above the first-mentioned carrier, neck-molds on said second carrier at intervals corresponding with the press and blow molds, two neck-molds being adapted to be positioned by their carrier over adjacent press and blow molds.

4. The combination of an intermittently-rotatable endless carrier, press and blow molds on the carrier, a second endless and intermittently-rotatable carrier, neck-molds on said second carrier at intervals corresponding with the press and blow molds, and mechanism for actuating said carriers to present, at each operation of the machine, a fresh neck-mold for pressing and fresh press and blow molds, substantially as shown and described.

5. The combination of a press-mold, a blow-mold, a sectional neck-mold, means for actuating the neck-mold to transfer a blank from the press-mold to a blow-mold, and mechanism acting automatically to open the neck-mold, substantially as shown and described.

6. The combination of a press-mold, a blow-mold, a sectional neck-mold, means for actuating the neck-mold to transfer a blank from the press-mold to the blow-mold, and automatically-acting mechanism for opening the neck-mold while in position over the blow-mold, substantially as shown and described.

7. The combination of press and blow molds, a carrier, sectional neck-molds on the carrier at intervals corresponding with the press and blow molds, mechanism for actuating the carrier to transfer a blank from a press-mold to a blow-mold and simultaneously to position a fresh neck-mold over a press-mold, and mechanism for opening the neck-molds while in position over the blow-molds, substantially as shown and described.

8. The combination of a press-mold, a blow-mold, intermittently-actuated pressing and blowing mechanisms operative simultaneously, an endless neck-mold carrier, a succession of neck-molds permanently mounted on the carrier, two of said neck-molds fitting over the press and blow molds, and intermittently-actuating mechanism for the carrier operative alternately with the simultaneous operation of the pressing and blowing mechanisms, substantially as shown and described.

9. The combination of an endless carrier, press and blow molds thereon, intermittently-actuated pressing and blowing mechanisms operative simultaneously in adjacent press and blow molds, means for transferring a pressed blank from a press-mold to a blow-mold, and actuating mechanism for the carrier, whereby fresh molds are positioned for each pressing and blowing operation, substantially as shown and described.

10. The combination of a carrier, press and blow molds thereon, sectional neck-molds, a carrier adapted to position two neck-molds over adjacent press and blow molds, mechanism for successively elevating, moving horizontally and lowering the neck-mold carrier, and means for opening the neck-mold having position over the blow-mold while the neck-mold carrier is in lowered position, substantially as shown and described.

11. The combination of the horizontal intermittently-rotatable carrier 14, press and blow molds thereon, carrier 57 above carrier 14, sectional neck-molds on carrier 57, two neck-molds registering with adjacent press and blow molds, means for opening the neck-mold registering with the blow-mold while carrier 57 is in lowered position, and mechanism for successively lifting, moving horizontally and lowering carrier 57, whereby a pressed blank is removed from a press-mold and deposited for completion in a blow-mold, substantially as shown and described.

12. The combination of carrier 14, press and blow molds thereon, carrier 57 above carrier 14, sectional neck-molds on carrier 57, two neck-molds registering with adjacent press and blow molds, means for opening the neck-mold registering with the blow-mold while carrier 57 is in lowered position, mechanism for successively elevating, moving horizontally and lowering carrier 57, and means for moving horizontally carrier 14 simultaneously with the horizontal movement of carrier 57, whereby fresh press-molds are advanced to operative position, substantially as shown and described.

13. The combination of carrier 57, sectional neck-molds thereon, a lever for each mold fulcrumed to the carrier and linked to the mold-sections, and a cam operatively engaging the levers for opening and closing the molds and for holding them in these positions, substantially as shown and described.

14. The combination of carrier 57, sectional neck-molds thereon, a lever for each mold fulcrumed to the carrier and linked to the mold-sections, a plate, a cam-groove in the plate, a portion of the groove being concentric with the said levers, and pins extending from the levers into the groove, substantially as shown and described.

15. The combination of intermittently-rotating shaft 56, oscillating shaft 49, carrier 57, sectional molds on the carrier, and mechanism operatively connecting shaft 49 and the molds for opening and closing them, substantially as shown and described.

16. The combination of intermittently-rotating shaft 56, oscillating shaft 49 within shaft 56, carrier 57 secured to shaft 56, molds on the carrier, and mechanism operatively connecting shaft 49 and the molds for opening and closing the latter, substantially as shown and described.

17. The combination of oscillating shaft 49, cam-plate 54 secured thereto, shaft 56 intermittently rotatable on shaft 49, mold-carrier 57 positioned on shaft 56 adjacent plate 54, and mechanism intermediate the molds and cam-plate, whereby the molds are opened and closed by the action of the cam, substantially as shown and described.

18. The combination of rotatable mold-carrier 57, plate 65 above and rotatable with the carrier and formed with a circular series of bolt-engaging points, mechanism for vertically reciprocating carrier 57 and plate 65, arm 69, means for oscillating the arm, and a bolt projecting from the arm and adapted, successively, to engage the bolt-engaging points of plate 65 for imparting thereto and to carrier 57 intermittent rotary movement, substantially as shown and described.

19. The combination of vertically-movable mold-carrier 57, oscillating arm 69, and mechanism operatively connecting the arm and mold-carrier when the latter is in raised position for imparting thereto intermittent rotary movement, substantially as shown and described.

20. The combination of horizontally-vibrating arm 69, shaft 49 movable vertically with relation to the arm but adapted to vibrate therewith, shaft 56 revoluble on shaft 49, mold-carrier 57 on shaft 56, separable molds on the carrier, operative connection between shaft 49 and the molds for opening and closing the latter, and mechanism to vertically reciprocate both shafts for operatively connecting the mold-carrier and arm 69, whereby the carrier is intermittently rotated by one vibration of said arm and the reverse vibration operates to open and close the molds through the medium of shaft 49, substantially as shown and described.

21. The combination of shaft 49 provided at its lower end with cam-plate 54, shaft 56, mold-carrier 57 on shaft 56, sectional molds on the carrier and mechanism operatively connecting plate 54 and the molds for opening and closing the latter, rotatable cam 52, arm 69 splined to shaft 49 and through which said shaft is vertically movable, lever 67 adapted to oscillate arm 69 and be oscillated by cam 52, and mechanism operatively connecting the mold-carrier and arm 69 when shaft 49 is elevated by cam 52, substantially as shown and described.

22. The combination of rotatable mold-carrier 14, press and blow molds on the carrier, neck-molds and carrier 57 therefor adapted to position the neck-molds over adjacent press and blow molds, and a plunger and blow-pipe operative simultaneously in adjacent press and blow molds, substantially as shown and described.

23. The combination of a rotatable endless carrier, sectional molds on the carrier, a rack, and mechanism operatively connecting the rack and mold-sections for opening and closing them, substantially as shown and described.

24. The combination of a rotatable endless carrier, sectional molds on the carrier, a rack, gears 44 engaging the rack, cam-plates 41 rotatable with the gears, and levers 38 connected at their outer ends to the mold-sections and at their inner ends operatively engaging plates 41, substantially as shown and described.

25. The combination of a mold-carrier, shafts rotatable thereon carrying mold holding or encircling bands, and molds secured in said bands, substantially as shown and described.

26. The combination of a rotatable endless carrier, shafts 30 journaled on the carrier, press-molds carried by the shafts, an interrupted rack beneath the carrier, and gears 33 on shafts 30 adapted to engage the rack, each gear having a flat part slidable on the smooth portion of the rack for holding shafts 30 with the molds in upright position, substantially as shown and described.

27. The combination of a rotatable endless carrier, bearings 31 and 32 thereon, bearing 32 being adjustable radially on the carrier, screws 32' for adjusting said bearings, shafts journaled in the bearings, and molds at the outer ends of the shafts, substantially as shown and described.

28. The combination of a rotatable endless carrier, mold-supports arranged radially thereon, molds at the outer ends of the supports, and means for adjusting longitudinally the supports, substantially as shown and described.

29. The combination of a rotatable endless mold-carrier, an arm adapted to oscillate concentrically with the carrier, mechanism adapted to positively interlock the carrier and arm during the forward oscillations of the arm, and means for automatically releasing said interlocking mechanism at the end of the forward stroke of the arm, whereby the latter is free to return for a new hold, substantially as shown and described.

30. The combination of a rotatable endless mold-carrier, an arm adapted to oscillate concentrically therewith, a bolt on the arm adapted to engage the carrier during its forward reciprocation, and mechanism positioned at the end of the forward stroke of the arm for disengaging the bolt from the carrier, substantially as shown and described.

31. The combination of a rotatable endless mold-carrier, lugs depending from the carrier, an arm adapted to oscillate concentrically with the carrier, vertically-movable spring-actuated bolts 18 and 19 carried by the arm and adapted to embrace opposite sides of said lugs, bolt 18 being beveled to ride beneath the lugs, and an arm having position at the end of the forward stroke of said oscillating arm and adapted to engage and depress bolt 19 free from the carrier-lug, whereby the oscillating arm is free for its backward reciprocation, substantially as shown and described.

32. The combination of a rotatable endless mold-carrier, an oscillating arm adapted to impart intermittent rotary movement to the carrier, a latch for arresting the movement of the carrier and for holding it fixed, and a connection between the arm and latch, whereby the latch is released by the backward reciprocation of the arm, substantially as shown and described.

33. The combination of a rotatable endless mold-carrier, an oscillating arm adapted to intermittently rotate the carrier, vertically-tilting latch 25 adapted to automatically engage the carrier at given points and hold it against further movement, a spring for maintaining said engagement, and rod 27 connecting the oscillating arm and latch 25, the rod being slidable on the latch during the greater part of its movement, whereby the latch is actuated only momentarily by the rod, substantially as shown and described.

34. The combination of vertically-reciprocating pressing mechanism, crank mechanism operatively connected to the pressing mechanism for reciprocating it, an endless mold-carrier, rod 21 adapted to be reciprocated by said crank mechanism, and an operative connection between the rod and carrier for imparting to the latter intermittent rotary movement, substantially as shown and described.

35. The combination of vertically-reciprocating pressing mechanism, crank mechanism operatively connected to the pressing mechanism for reciprocating it, an endless mold-carrier, an oscillating ratchet adapted to engage the carrier and impart thereto intermittent rotary movement, and a rod connecting the ratchet and the said crank mechanism, whereby the ratchet is oscillated, substantially as shown and described.

36. The combination of a rotatable series of pressing-plungers, a gear rotatable therewith, and a rack adapted to engage the gear and impart thereto intermittent rotary movement, whereby the plungers are brought, successively, to operative position, substantially as shown and described.

37. The combination of a vertically reciprocating and revoluble series of pressing-plungers, a gear rotatable therewith, a slidable rack adapted to engage the gear when the latter is in raised position, and means for sliding the rack, whereby the plungers are brought, successively, to operative position, substantially as shown and described.

38. The combination of a vertically reciprocating and revoluble series of pressing-plungers, a gear rotatable therewith, a slidable rack adapted to engage the gear when the latter is in raised position, mechanism for reciprocating the plungers, and an operative connection between said mechanism and the rack for sliding the latter, substantially as shown and described.

39. The combination of a vertically reciprocating and revoluble series of pressing-plungers, a gear rotatable therewith, a slidable rack adapted to engage the gear when the latter is in raised position, a horizontally-oscillating vertically-slotted pitman for reciprocating the plunger series, and a pin projecting from the rack and working in the pitman-slot, substantially as shown and described.

40. The combination of blowpipe 71 valved at 74, valve-operating lever 75 paralleling the pipe, vertically-movable pressing mechanism, and arm 73 movable therewith, said arm being adapted to move lever 75 for opening the valve, substantially as shown and described.

41. The combination of pressing mechanism, a blowpipe, mechanism for simultaneously reciprocating the same, arm 73 carried by the pressing mechanism and embracing the blowpipe, and spring 76 encircling the pipe and secured at its lower end thereto, arm 73 being adapted to compress the spring and exert the tension thereof on the pipe for holding the latter to operative position, substantially as shown and described.

In testimony whereof I have hereunto set my hand in presence of two subscribing witnesses.

FRANK O'NEILL.

Witnesses:
IRVIN P. DOOLITTLE,
A. McDOUGALL.